United States Patent Office 3,367,027
Patented Feb. 6, 1968

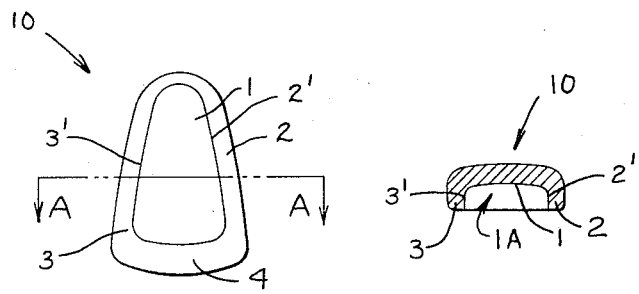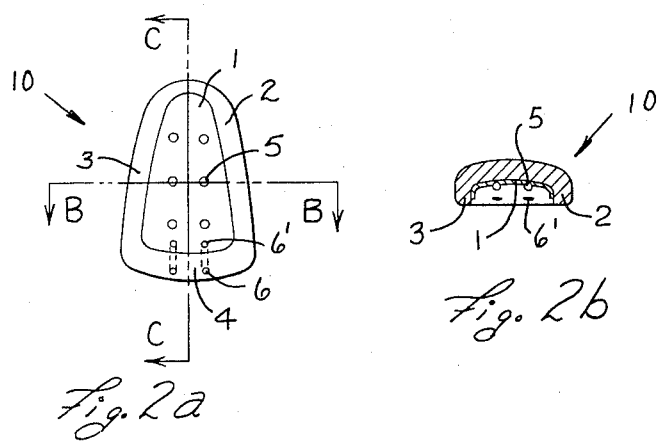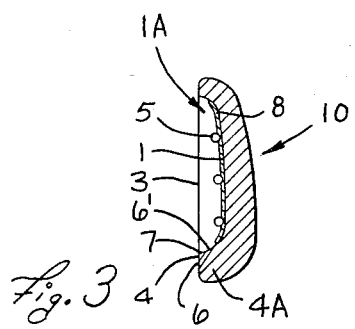

3,367,027
PORCELAIN TEETH HAVING A NEW HOLDING STRUCTURE AND METHOD FOR MANUFACTURING SAME
Kazuo Kato, 35 RC. Komuinskukusha, 35 Mukodai-machi, Nakano-ku, Tokyo, Japan
Filed Apr. 22, 1965, Ser. No. 449,956
Claims priority, application Japan, Apr. 24, 1964, 39/22,862
15 Claims. (Cl. 32—10)

This invention relates to porcelain teeth having a new holding structure and to a method for manufacturing same.

More particularly, this invention relates to a method of manufacturing a porcelain tooth, which comprises baking a porcelainic substance, preferably of feldspar or a substantially glass-like material into a body, the back of which includes a concavity with bottom and side walls, said concavity leaving at the top and both sides of said back, a strip of a certain width; applying on the bottom surface or on the bottom and side surfaces of said concavity very fine glassy powder with lower melting temperature than that of the body, mixed with water, in thin layers; further applying on such layers a number of balls with higher melting point than that of said glassy powder, such as a number of glass balls or a number of porcelain balls or metal balls added with said fine glassy powder mixed with water; baking and melting said fine glassy powder and then cooling same for attaching said group of balls uniformly on the back of the porcelain teeth; and, in the direction from the back side of the top of the body to the top part of inner side of the side wall, drilling several angled holes therethrough, thus establishing by the combination of said group of balls and said through holes a holding structure in said porcelain tooth. The invention further relates to the porcelain tooth products substantially as obtained thereby.

Among the existing methods of holding porcelain teeth on a desired base or bed methods using gold or alloy pins are to be mentioned first. However, in these existing methods, there exist certain defects caused by the difference in the characteristics of the two materials, ceramic and metal, such as differences in expansion, bad wetting of or adhesion to each other, etc., often resulting in the breakage at the contact point.

Further, steel or gold-bed porcelain teeth are known at present, but, as such porcelain teeth are attached to the beds by means of metal pins or plates, a partial uneven stress is caused and in general such constructions are weak as a whole.

There is another method in which porcelain teeth are attached to a plastic bed, i.e., by drilling the holes in the middle of the porcelain teeth and filling them with plastic materials. This method of holding is not sufficient, but weak, giving cause to breakage or chipping at these points of holding.

Further, one of the grave defects of porcelain teeth with the existing methods of holding is that in porcelain teeth attached with an iron pin, metal plate or post, a thicker porcelain tooth body is generally required. Especially when applied on an artificial tooth bed or on a crown, excess thickness of the body will bring about undesirable problems, necessitating the scraping of the body, or the cutting off of a part of the pin with attendant difficulties in fabrication.

In the porcelain teeth with the new holding structure described in this invention, glass or metal balls are uniformly implanted on the surface by a heating and melting process. Accordingly, the thickness of the porcelain tooth body can be made 1 mm. thick or even less. Moreover, since the entire back surface can be utilized as the holding area, it becomes possible to attach the plastic substance thereon, or even possible to cement by dint of this holding structure. Especially in this new method described herein, great holding strength can be expected to an extent never previously attained by existing methods.

According to this invention, the attaching of the holding body can be done very simply and easily, not as in the existing ones. Accordingly, by the use of the porcelain teeth of this invention, ideal adhesion can be obtained between the ceramic of the porcelain and a plastic bed, or between the ceramic and a metal bed which never has been attained in the existing holding methods using gold pins, etc.

In the following description reference will be made to the attached drawings.

In the drawings:

FIGURE 1a shows the back side of a porcelain tooth before the holding structure is established.

FIGURE 1b shows the cross section through A—A line of FIGURE 1a.

FIGURE 2a shows the back side of a porcelain tooth after the holding structure is established.

FIGURE 2b shows the cross section through B—B line of FIGURE 2a.

FIGURE 3 shows the cross section through C—C line of FIGURE 2a.

As shown in FIGURE 1a, and FIGURE 1b, a tooth body 10 preferably of porcelain is baked into a form preferably with its back surface concaved. In these figures, 1 shows the bottom of the concavity 1A in the back of the tooth body 10, the thickness of the tooth at the bottom of the concavity preferably being about 1 mm. Both 2 and 3 represent the side walls of the porcelain tooth, 2' and 3' show the side surfaces of the concavity 1A and 4 indicates the back surface of the normal top end 4A of the porcelain tooth. The thickness of the side walls 2 and 3 and top 4A is usually 2–3 mm. and the width of the bottom of the concavity is usually about 2.5–3 mm. in middle anterior teeth.

FIGURE 2 shows the situation in which the holding bodies are attached on the back surface of the porcelain tooth. More specifically, in FIGURE 2, a group of balls 5 are attached to the concavity, the balls preferably being uniformly distributed on the bottom wall 1 as indicated here or also on the side walls 2' and 3' of the concavity 1A and held thereto by one or more layers of suitable joining material preferably fused glass or porcelain powder as indicated at 8. As shown in FIGURE 2a, several holes, here a pair thereof, are drilled from the center part of the back surface 4 of the top toward concavity 1A at an acute, inwardly opening angle to the back through the top 4A toward the inner wall surface of the concavity 1A and, hence, toward the mark 6', completing the through holes 6–6'. These through holes 6–6' can be straight as indicated here or bended on the way. The diameter of these holes is preferably about 1 mm. Such holes here leave a generally wedge-shaped zone 7. The balls 5 where they are attached to the body provide crevices which with the holes 6 normally receive and become interlocked with suitable material used to affix the tooth 1A to a suitable bed, not shown. As described above, the balls 5 can be attached on the side walls 2' and 3' of the concavity, but, instead, several holes or slots can be drilled straight or slantwise on the side walls 2' and 3' of the concavity or lateral grooves can be drilled along the side walls 2' and 3'.

The balls 5 are of glass in the preferred embodiment of the invention and are preferably of the ordinary soda lime kind, or of any ceramic kind, including special kinds of glass, with a melting point approximately between 800–900° C. The composition of glass is preferably 62–80% of $SiO_2$, 1–12% of CaO, 1–4% of MgO, 0–8% of $B_2O_3$, 12–14% of $Na_2O$, 0–5% of $Al_2O_3$, 0–8% of BaO. Glass of the composition of 0.5–30% of $TiO_2$, 2–35% of $SiO_2$, 1–35% of $Al_2O_3$, 0–12% of $B_2O_3$, 0.1–1.1% of $Li_2O$, 0–19% of $Na_2O$, 0–5% of BaO, 0–5% of CaO, 0–5% of ZnO, and also containing MgO, $K_2O$, $As_2O_3$, PbO, F, Ag, SrO, etc. can also be used.

As an example, glass consisting of 2.33% of $SiO_2$, 28.86% of $TiO_2$, 9% of $B_2O_3$, 7.61% of $Al_2O_3$, 45.55% of BaO, 1.12% of SrO, 4.12% of ZnO, 0.9% of $Na_2O$, 0.24% of CaO, 0.16% of Ag can be mentioned.

The proper size of the glass balls is 0.8–1.4 mm. in diameter. Smaller glass balls with the diameters of less than 0.8 mm. are not suitable as the holder, because they give less space for undercut after they are welded and very often give a strength less than 10 kgs. (The strength is measured following the method of testing ordinary porcelain teeth, in which the back of a porcelain tooth is welded to a metal surface so as to form an angle of 45° between the tooth and the metal surface which has a holding pin thereon using a plastic adhesive substance and a force is exerted on the tooth parallel to the metal surface, the force required to dislodge the tooth from the surface being called the breaking strength. The same method is applied throughout in this specification.)

On the other hand, when the diameter of the glass ball exceeds 1.4 mm., they are too big to be put in the concavity on the back of the porcelain tooth and, therefore, inappropriate in appearance as well as in use.

In these ranges above mentioned, several tests were carried out using the upper middle anterior teeth for comparison of the strength, and one example in which 15–20 balls of 1 mm.±0.1 mm. were arranged uniformly on the area of 5.5 x 10 mm. gave the highest strength of 20–30 kgs. The ratio of the area occupied by the balls to the available holding area was 60–70% per unit area. When the number of balls decreases, the density decreases accordingly, giving the strength of less than 20 kgs. in some cases. And when the density exceeds this limit the adhesion between glass balls and plastic or cement decreases, giving unsatisfactory and unstable results ranging between 12–15 kgs. in many cases.

When used in splicing, instead of use on the bed of artificial teeth, balls of 0.8–1 mm. in diameter are preferred. As the diameter of the cast metal post to be planted in the tooth root is ordinarily about 1 mm. and this is to be inserted from the crown part into root part of the tooth and then is secured on the position, when balls of 0.8–1 mm. in diameter are used, it is easy to insert the post in the right position, and to obtain satisfactory strength of 20–30 kgs. Accordingly, in this particular usage of the invention, the proper size of balls to be used is 0.8–1.0 mm. in diameter, and the proper ratio of the area the balls occupy on the surface is about 60% per unit area. Generally, as lower teeth are smaller in size, the balls of about 0.8 mm. in diameter are specially suited in the practice of this invention, giving easier workability and consequently higher strength.

The fine glass or substantially glass-like powder which is to be used for joining the glass balls or metal balls to the body or porcelain tooth must have a proper melting point, and a sufficient adhesive power. The melting point of glass balls is preferably about 850° C. (800–950° C.), and that of metal balls is preferably above 1100° C. Accordingly, joining materials with melting points lower than these, and at the same time lower than the melting point of porcelain teeth body must be used in joining.

As the glassy powder to be used in joining the glass balls on the porcelain teeth body, the one with the following composition is suitable, i.e., 29–70% of $SiO_2$, 2–10% of CaO, 2–15% of $Na_2O$ (or $K_2O$), 5–30% of $B_2O_3$, 1–8% of MgO, 0–15% of $Al_2O_3$.

As one specific example, 50.8% of $SiO_2$, 2.52% of $Al_2O_3$, 11.6% of $Na_2O$, 7.87% of CaO, 20.6% of $B_2O_3$, 4.61% of MgO can be used.

For another example, 49.8% of $SiO_2$, 8.7% of $Al_2O_3$, 2.32% of $Na_2O$, 6.11% of CaO, 25.2% of $B_2O_3$, 7.78% of MgO can be mentioned.

Glassy powders having such compositions as mentioned above have melting points of 700–800° C. and adhere to the porcelain tooth body and to the glass balls powerfully. In practice of this invention the use of a porcelain material, a joining material comprising a fine glassy powder, the glass ball with compositions and heat expansions similar to each other is preferred in order to maintain them satisfactorily and eliminate problems due to deformation.

In this invention, porcelain balls can be used instead of glass balls. Such porcelain balls preferably have the following composition: 10–75% to $SiO_2$, 10–89% of $Al_2O_3$, 0.5–13% of $Na_2O$ (or $K_2O$ or CaO), 0–9% of MgO. They are baked at relatively high temperatures such as at above 1300° C.

When glass and porcelain balls are compared, the former has higher transparency, and gives no color effect on the porcelain tooth body. Further, the former is superior in that it is beautiful and strong, elastic, and easy in manufacture. The porcelain balls on the other hand, have poorer transparency and are comparatively troublesome in manufacture. But once they are manufactured they are tough in baking, strong against deformation and consequently higher in strength. Some preferred examples of such porcelain balls are: mulitic porcelain balls with the constitution of 67.2% of $Al_2O_3$, 1.67% of MgO, 31.2% of $SiO_2$, 2.3% of $Na_2O$, or mulitic balls of the following constitution of 72% of $Al_2O_3$, 28% of SiO, or balls with the constitution of 89% of $Al_2O_3$, 0.1% of MgO, 10% of $SiO_2$, or feldspar balls with the constitution of 69.99% of $SiO_2$, 17.27% of $Al_2O_3$, 12.74% of $Na_2O$, or hard porcelain balls with the constitution of 62.5% of $SiO_2$, 36.5% of $Al_2O_3$, 1% of $Na_2O$.

They give satisfactory strength of 20–30 kgs., when properly used.

Next, mention is made of the metal balls. In order to prevent the oxidation during the heat treatment under 1000° C. the use of the alloy consisting mainly of Au-Pd-Pt is recommended. Metal balls are strong but they have the tendency to blacken, reflecting the dark color on the porcelain tooth body. Considering the price and the easiness of manufacturing, glass balls are more advantageous.

As the joining substance, the fine glass powder mentioned above may be used in joining the metal balls as in the case of glass balls. Examples of proper constitution for metal balls are as below.

(1) 59–85% of Au, 8–30% of Pt, 1.5–12% of Pd, 0.2–10% of Ir, 0–2.5% of Ag, 0–1% of Sn. This alloy metal is heat resistant and has a melting point of above 1100° C.

(2) 85% of Au, 10% of Pt, 2% of Pd, 1% of Sn, 2% of Ag, with the Brinnel hardness of 90.

(3) 70% of Au, 22% of Pt, 6.0% of Pd, 2% of Ir with Brinnel hardness of 120.

(4) 80% of Au, 12% of Pt, 5% of Pd, 0.5% of Ir, 2.5% of Ag with Brinnel hardness of 100.

*Example 1*

On the concaved back surface (5.5 x 10 mm.) of a porcelain tooth, which had been baked into a concaved form, and 1 mm. thick in the body, gum Arabic is applied, and then the glassy fine powder passing 200 mesh, and consisting of the glassy material of 25.5% of $SiO_2$, 5% of feldspar, 47.5% of borax, 11.5% of $CaCO_3$, and 10% of $MgCO_3$, mixed with water into thin paste, is applied with a brush. Then, on this surface, glass balls, about 15 to 20 in number and 1 mm. in diameter, which consists of 63% of $SiO_2$, 1.2% of CaO, 1% of MgO, 2% of $B_2O_3$, 14% of $Na_2O$, 0.5% of $Al_2O_3$ and 7.5% of BaO are uniformly arranged and baked for several minutes at a temperature of 800° C. letting the glassy powder melt, and welding the glass balls on the body of the porcelain teeth. In the arrangement of balls, about 10 to 20% of glassy fine powder is added to the glass ball group, mixed with water, and applied on the surface. The porcelain teeth thus obtained showed such high holding strength as 30 kgs.

Several tests had been made in this way using various size of balls, and changing the density of distribution of the balls (i.e. number of balls) and the results showed that satisfactory strength could be obtained when balls of more than 0.5 mm. in diameter were used, when plastic materials were used as the cementing material. The adhesive power increased as the diameter of the ball increased, and in view of the holding power of the porcelain teeth, good result was obtained when balls of about 1 mm. in diameter were used. The proper number of balls was 15–20 with balls of 1 mm. in diameter.

*Example 2*

The test was made on a thin porcelain tooth body which consisted of feldspar, or glassy porcelainic substance, the back of which was formed as a plane or as a concavity, whose thickness was about 1 mm. and which was baked into this form.

Using alloys consisting of (1) 67%–68% of Au, 22% of Pt, 6–8% of Pd, and 2–4% of Ir, or (2) 85% of Au, 10% of Pt, 2% of Pd, 1% of Sn, and 2% of Ag respectively, balls of 0.5–1.2 mm. in diameter were made.

Using the cementing material which was obtained by adding more than 1% of $K_2O$, and 3% of $B_2O_3$ to the porcelain material of the tooth body, glassifying and pulverizing the mixture, or using the powdered glass mentioned in Example 1 (passing a 200 mesh screen), metal balls were attached to the back of the body at about 1000° C. for the former (1), and 800–1050° C. for the latter (2). In more detail, glass powder was coated thinly on the surface of the porcelain tooth, and a mixture of metal balls and 10–20% of glass powder was coated thereon, and, then, at the above-mentioned temperature, the specimens were baked for a few minutes. The porcelain teeth thus obtained can adhere not only to the plastic bed, but also to metal beds by cement, or by metal casting.

The porcelain teeth thus obtained gave the strength of more than 20 kgs. when 0.8 mm. balls in diameter were used.

In investigating the state of breakage, while the existing porcelain pin teeth break off at the pin part, the specimens made by the present invention's method kept themselves together until the cracks appeared all over the surface showing the firm and uniform adhesion on whole contact or holding surface. It was found, in inspecting the state of peeling off on the back after the breakage, that the glass balls remained as they were, and that part of the porcelain tooth body was torn off. With this result it is perceivable that there existed not only between glass balls and plastic bed, but also between glass balls and porcelain teeth body sufficient mutual adhesion. In order to obtain better results, it is recommended to avoid the random selection of the finely powdered glassy cementing material, but try to bring as close the constitution of the cementing material to that of the porcelain material as possible. At the same time, it will be necessary to select the cementing material whose melting point is lower than that of the porcelain teeth material, and that of balls. In order to eliminate development of strains, materials having similar coefficients of expansion should be selected.

In the use of porcelain teeth prepared by this invention the fitting of the biting surface of teeth is better secured, the form more natural, and well arranged as a whole.

Also, porcelain teeth prepared by this invention may be caused to adhere to a metal bed by use of cement, and investigation has showed that under a force of more than 13 kgs. part of cement was torn off with the glass balls intact. This shows that the teeth made by this invention can be applied to beds of any kind with satisfaction.

In case where metal balls were used, as in the case of glass balls, they adhered to the bed perfectly, until cracks due to total breakdown appeared, showing superior adhesive effect which were not seen before.

Although particular preferred embodiments of the invention have been disclosed above for illustrative purposes, it will be noted that variations or modifications thereof lying within the scope of the appended claims are fully contemplated.

The embodiments of the invention in which an exclusive property or privilege is claimed are defined as follows:

1. A method for manufacturing a porcelain tooth, which comprises the steps:
    baking a porcelainic substance into a body, the back of which body includes concavity;
    applying on the surface of said concavity a mixture of glass-like powder, with a lower melting temperature than that of said body, and water in at least one layer;
    further applying on said surface a plurality of balls with a higher melting point than that of said powder;
    melting said powder and then cooling same for attaching said group of balls uniformly on the back of said body; and
    providing at least one angled hole through said body between said back thereof outside said concavity and said concavity and thus establishing a holding structure in said porcelain tooth by the combination of said balls and said holes.

2. A method for manufacturing a porcelain tooth, which comprises the steps:
    baking a porcelainic substance into a body, the back of which body includes a concavity with bottom and side walls, said concavity leaving a strip of predetermined width in said back at least at the top and both sides of said body and outside said concavity;
    applying on the bottom surface or on the bottom and side surfaces of said concavity a mixture of a very fine glass powder, with a lower melting temperature than that of said body, and water in a plurality of thin layers;
    further applying on said layers a plurality of balls with a higher melting point than that of said glass powder, the material of said balls being selected from the group consisting of glass, porcelain and metal;
    baking said tooth at a temperature sufficiently high as to melt said fine glass powder and then cooling same for attaching said group of balls uniformly on the back of said body; and
    drilling several angled holes through said body in the direction from the back side of the top of the body to the top part of inner side of said side wall and thus establishing by the combination of said group of balls and said holes a holding structure in said porcelain tooth.

3. The method defined in claim 2 in which said balls are of glass, have a melting point approximately between 800–900° C. and are composed of 62–80% of $SiO_2$, 1–12% of CaO, 1–4% of MgO, 0–8% of $B_2O_3$, 12–14% of $Na_2O$, 0–5% of $Al_2O_3$ and 0–8% of BaO.

4. The method defined in claim 2 wherein said balls are of porcelain, comprise 10–75% of $SiO_2$, 10–89% of $Al_2O_3$, 0.5–13% of $Na_2O$, $K_2O$ and CaO, 0–9% of MgO and are baked at a temperature above about 1300° C.

5. The method defined in claim 2 wherein said balls are of metal comprising 59–89% of Au, 8–30% of Pt, 1.5–12% of Pd, 0.2–10% of Ir, 0–2.5% of Ag, 0–1% of Sn and in which said metal balls are mixed with an amount of said powder and water when applied to said body.

6. The method defined in claim 2 in which said powder comprises 29–70% of $SiO_2$, 2–10% of CaO, 2–15% of an oxide selected from the group consisting of $Na_2O$ and $K_2O$, 5–30% of $B_2O_3$, 1–8% of MgO and 0–15% of $Al_2O_3$ and have a melting point between 700–800° C.

7. An artificial tooth construction comprising:
- a rigid nonmetallic body hollowed on the back side thereof;
- at least one layer of fused material on at least a portion of said back side;
- a plurality of holding bodies attached on said back side by said fused material;
- at least one hole through said body between the hollowed portion and the rest of said back side;
- whereby the combination of said holding bodies and said holes establish a holding structure in said tooth.

8. A porcelain tooth comprising:
- a porcelainic body, the back of which body includes a concavity;
- at least one layer of fused glass-like powder;
- a plurality of balls with a higher melting point than that of said powder and attached uniformly on the back of said body by said fused powder;
- at least one angled hole through said body between said back thereof outside said concavity and said concavity;
- whereby the combination of said balls and said holes establish a holding structure in said porcelain tooth.

9. The device defined in claim 8 in which the back side of said body includes a strip of predetermined width bordering said concavity at least along the top end and sides of said body;
- a plurality of said holes extend at an acute angle to said back surface of said body and are located adjacent the top end of said body.

10. The device defined in claim 8 in which said glass powder is of a composition having a melting temperature less than that of said body and said balls and in which said balls are of glass between 0.8 mm. and 1.4 mm. in diameter.

11. The device defined in claim 8 wherein said balls are of porcelain, comprising 10–75% of $SiO_2$, 10–89% of $Al_2O_3$, 0.5–13% of $Na_2O$, and oxide selected from the group consisting of $K_2O$ and CaO and 0–9% of MgO and baked at a temperature above about 1300° C.

12. The device defined in claim 8 wherein said balls are of metal comprising 59–85% of Au, 8–30% of Pt, 1.5–12% of Pd, 0.2–10% of Ir, 0–2.5% of Ag, 0–1% of Sn and in which said metal balls are mixed with a further amount of said powder and water when applied to said body.

13. The device defined in claim 8 in which said powder comprises 29–70% of $SiO_2$, 2–10% of CaO, 2–15% of an oxide selected from the group consisting of $Na_2O$ and $K_2O$, 5–30% of $B_2O_3$, 1–8% of MgO, 0–15% of $Al_2O_3$ and having a melting point between 700–800° C.

14. The device defined in claim 8 in which said balls are of glass, with a melting point approximately between 800–900° C. and composed of 62–80% of $SiO_2$, 1–12% of CaO, 1–4% of MgO, 0–8% of $B_2O_3$, 12–14% of $Na_2O$, 0–5% of $Al_2O_3$, 0–8% of BaO.

15. The device defined in claim 8 in which said balls occupy a predetermined zone on the back of said body and in which about 60% to 70% of the area of said zone is covered by said balls.

References Cited
UNITED STATES PATENTS

| | | | |
|---|---|---|---|
| 1,383,696 | 7/1921 | Davis | 32—10 |
| 2,179,502 | 11/1939 | Erdle | 32—10 |

LOUIS G. MANCENE, *Primary Examiner.*